United States Patent
Tanaka et al.

(10) Patent No.: US 9,120,223 B2
(45) Date of Patent: Sep. 1, 2015

(54) METHOD OF CONTROLLING SEVEN-AXIS ARTICULATED ROBOT, CONTROL PROGRAM, AND ROBOT CONTROL DEVICE

(75) Inventors: Hideki Tanaka, Nishinomiya (JP); Takamasa Ogata, Kobe (JP); Tetsuya Kubota, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 112 days.

(21) Appl. No.: 13/977,272

(22) PCT Filed: Dec. 21, 2011

(86) PCT No.: PCT/JP2011/007158
§ 371 (c)(1),
(2), (4) Date: Aug. 1, 2013

(87) PCT Pub. No.: WO2012/090441
PCT Pub. Date: Jul. 5, 2012

(65) Prior Publication Data
US 2013/0310973 A1 Nov. 21, 2013

(30) Foreign Application Priority Data
Dec. 28, 2010 (JP) .................................. 2010-293341

(51) Int. Cl.
*G06F 19/00* (2011.01)
*B25J 9/06* (2006.01)
*B25J 9/04* (2006.01)
*B25J 9/16* (2006.01)

(52) U.S. Cl.
CPC .. *B25J 9/06* (2013.01); *B25J 9/046* (2013.01); *B25J 9/1607* (2013.01); *B25J 9/1643* (2013.01); *G05B 2219/39018* (2013.01)

(58) Field of Classification Search
CPC .......................................................... B25J 9/06
USPC .................................................... 700/245–264
See application file for complete search history.

(56) References Cited

U.S. PATENT DOCUMENTS

| | | | |
|---|---|---|---|
| 4,999,553 A | 3/1991 | Seraji | |
| 5,444,343 A * | 8/1995 | Enomoto et al. | 318/568.11 |
| 2009/0118864 A1* | 5/2009 | Eldridge et al. | 700/259 |

FOREIGN PATENT DOCUMENTS

| | | |
|---|---|---|
| JP | A-02-298482 | 12/1990 |
| JP | A-05-050386 | 3/1993 |
| JP | A-06-332510 | 12/1994 |

(Continued)

OTHER PUBLICATIONS

Mar. 13, 2012 International Search Report issued in International Application No. PCT/JP2011/007158.

*Primary Examiner* — Bhavesh V Amin
(74) *Attorney, Agent, or Firm* — Oliff PLC

(57) ABSTRACT

Provided is a method of controlling a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that rotational axes of three proximal end side joints of the robot do not intersect with each other at one point. The method includes performing inverse transformation using, as a constraint condition, such a joint angle of a middle joint among the three joints as to cause an assumed elbow angle to be constant in a case where a rotational axis of the middle joint is assumed as a shoulder.

4 Claims, 13 Drawing Sheets

(56) References Cited

FOREIGN PATENT DOCUMENTS

| JP | A-2009-066738 | 4/2009 |
| JP | A-2009-125892 | 6/2009 |
| JP | A-2009-226552 | 10/2009 |
| WO | WO 2010/060475 A1 | 6/2010 |

* cited by examiner

METHOD OF CONTROLLING SEVEN-AXIS ARTICULATED ROBOT, CONTROL PROGRAM, AND ROBOT CONTROL DEVICE

TECHNICAL FIELD

The present invention relates to a method of controlling a seven-axis articulated robot, a control program, and a robot control device. The present invention particularly relates to a method of controlling a seven-axis articulated robot including a mechanism in which at least one of the rotational axes of three proximal end side joints of the robot does not intersect with the other rotational axes of the three proximal end side joints at one point, the method allowing the seven-axis articulated robot to operate smoothly in a manner similar to that of a human arm.

BACKGROUND ART

In recent years, industrial robot control technology has advanced with advancement in computer technology. Accordingly, industrial robots are required to be able to operate in a more complicated and sophisticated manner, and required to be faster and more precise. For example, in the case of conventional six-axis articulated robots widely used as industrial robots, although conventional six-axis articulated robots are sufficiently capable of moving to a specified position, it is difficult for them to perform complex tasks while efficiently avoiding various obstacles existing in their moving space. Therefore, in recent years, development of seven-axis articulated robots has been actively conducted. A seven-axis articulated robot is configured such that a six-axis articulated robot including a total of six rotational axes at respective joints JT1 to JT6 additionally includes a redundant rotational axis at a joint JT7.

In a method of controlling a seven-axis articulated robot, similar to a conventional method of controlling a six-axis articulated robot, inverse transformation (coordinate transformation) with which to obtain each joint angle (joint coordinates) from a positional orientation of the wrist (wrist coordinates) of the robot is performed. In order to realize smooth motion similar to motion of a human arm, the angle of the elbow of the robot needs to be a constant angle as a constraint condition in performing the inverse transformation.

With reference to FIG. 10, a description is given by taking as an example a seven-axis articulated robot including a mechanism in which the rotational axis of a joint JT1, the rotational axis of a joint JT2, and the rotational axis of a joint JT7 intersect with each other at one point.

FIG. 10 defines a "shoulder (S)", an "elbow (E)", and a "wrist (W)" of the seven-axis articulated robot. The shoulder (S) indicates an intersection point where the rotational axes of the respective joints JT1, JT2, and JT7 intersect with each other; the wrist (W) indicates an intersection point where the rotational axes of respective joints JT4, JT5, and JT6 intersect with each other; and the elbow (E) indicates the rotational axis of a joint JT3. As shown in FIG. 11, a plane SEW defined by the shoulder (S), elbow (E), and wrist (W), i.e., defined by these three points, can be rotated around a straight line SW with the position and orientation of the wrist kept constant. Generally speaking, an elbow angle θE is defined as a rotating joint angle ∠EHE' of the "elbow (E)" around a vector connecting the shoulder (S) and the wrist (W). Inverse transformation is performed under a constraint condition that the elbow angle θE is kept constant.

For example, Patent Literature 1 discloses in paragraph [0012] that a seven-axis articulated robot can be considered to be equivalent to a six-axis articulated robot by fixing a seventh joint (joint axis J3) of the seven-axis articulated robot. Patent Literature 1 also discloses in paragraph [0014] that a seven-axis articulated robot with no Y-direction offset between joint axes J1 and J2 is configured such that, in order to avoid interference with a six-axis articulated robot installed at a predetermined distance from the seven-axis articulated robot, an elbow (joint axis J4) moves in a manner to draw a substantially arc trajectory while using an XY plane in which the joint axis J2 is included, a shoulder (intersection point of the joint axes J1 and J2), and a wrist (joint axis J6) as supporting points.

CITATION LIST

Patent Literature

PTL 1: Japanese Laid-Open Patent Application Publication No. 2009-125892

SUMMARY OF INVENTION

Technical Problem

Next, a description is given by taking a seven-axis articulated robot shown in FIG. 12 as an example, the seven-axis articulated robot including a mechanism in which the rotational axis of a joint JT1, the rotational axis of a joint JT2, and the rotational axis of a joint JT7 do not intersect with each other at one point.

In the seven-axis articulated robot of FIG. 12, an offset is set between the joints JT1 and JT2 for the purpose of increasing the working range of the robot, and the seven-axis articulated robot of FIG. 12 includes a mechanism in which the rotational axes of the respective joints JT1, JT2, and JT7 do not intersect with each other at one point. In the case of such a mechanism in which an offset is set, the shoulder (S) of the seven-axis articulated robot cannot be precisely defined. Even if the vicinity of the rotational axis of the joint JT2 is assumed as a shoulder, there arises a problem of imprecision in an elbow angle which is necessary for inverse transformation processing. That is, in the case of a mechanism in which an offset is set, it is difficult to perform inverse transformation to realize motions in which the elbow angle is kept constant.

In this respect, as shown in FIG. 13, there is one conceivable method in which inverse transformation is performed under a constraint condition that the current joint angle of a joint JT7 additionally included as a redundant axis (JT7 current value) is fixed. In this method, however, the joint angle of the joint JT7 additionally included to obtain redundancy is fixed while the robot is in operation. Thus, the degree of freedom is wastefully reduced for one joint.

The present invention has been made to solve the above-described problems. An object of the present invention is to suitably realize control of a seven-axis articulated robot including a mechanism in which at least one of the rotational axes of three proximal end side joints among seven joints of the robot does not intersect with the other rotational axes of the three proximal end side joints at one point, the control allowing the seven-axis articulated robot to operate smoothly in a manner similar to that of a human arm.

Solution to Problem

In order to solve the above problems, a seven-axis articulated robot control method according to the present invention is a method of controlling a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point. The method includes performing inverse transformation using, as a constraint condition, such a joint angle of a middle joint among the three joints as to cause an assumed elbow angle to be constant in a case where a rotational axis of the middle joint is assumed as a shoulder.

Even in the seven-axis articulated robot with the above-described configuration, an assumed elbow angle can be defined in the case where the rotational axis of the middle joint (JT2) among the three joints is assumed as a shoulder (the assumed shoulder will be described below). The inventors of the present invention have found out the following feature (i.e., obtained the following finding) regarding the behavior of the seven-axis articulated robot; "the joint angle of the middle joint changes substantially in proportion to changes in the assumed elbow angle whatever the initial state at the start of operation of the robot is". In view of this, without fixing the joint angle of a distal end side joint (i.e., JT7 mentioned below) among the three joints, inverse transformation is performed by using, as a constraint condition, such a joint angle of the middle joint as to cause the assumed elbow angle to be constant. This makes it possible to suitably realize control of the seven-axis articulated robot with the above-described configuration, the control allowing the seven-axis articulated robot to operate smoothly in a manner similar to that of a human arm.

The above control method may include: calculating a first maximum value and a first minimum value, which are possible values of the joint angle of the middle joint and which are values to be taken from an initial state at a start of operation of the robot, by performing inverse transformation while setting a joint angle of a distal end side joint among the three joints to 0° (a reference position) or 180° (a maximum displacement position from the reference position); and calculating, as an index indicating the assumed elbow angle, a ratio of the joint angle of the middle joint in the initial state within a range from the first maximum value to the first minimum value. In the above control method, such a joint angle of the middle joint as to cause the calculated ratio to be constant may be used as the constraint condition.

In the above control method, a step of the constraint condition may include: calculating a second maximum value and a second minimum value which are possible values of a current joint angle of the middle joint when the robot is in operation, by performing inverse transformation while setting the joint angle of the distal end side joint to 0° (the reference position) or 180° (the maximum displacement position from the reference position); calculating a target value of the current joint angle of the middle joint when the robot is in operation, based on the calculated second maximum value, the calculated second minimum value, and the calculated ratio; and applying the calculated target value to the joint angle of the middle joint, the joint angle being used as the constraint condition when performing the inverse transformation.

In addition, the inventors of the present invention have found out the following feature regarding the behavior of the seven-axis articulated robot with the above-described configuration; "if the joint angle of the distal end side joint is 0° (the reference position), the assumed elbow angle is 0° and the joint angle of the middle joint is the first minimum value (or the first maximum value) whatever the initial state at the start of operation of the robot is; and if the joint angle of the distal end side joint is 180° (the maximum displacement position from the reference position), the assumed elbow angle is 180° and the joint angle of the middle joint is the first maximum value (or the first minimum value)". In other words, the inventors of the present invention have found that the assumed elbow angle changes from 0° to 180° in accordance with changes in the joint angle of the distal end side joint from 0° to 180°, and that the joint angle of the middle joint changes from the first minimum value to the first maximum value (or from the first maximum value to the first minimum value) substantially in proportion to the changes in the assumed elbow angle. In view of this, the ratio of the joint angle of the middle joint in the initial state within the range from the first maximum value to the first minimum value is calculated as an index indicating the assumed elbow angle, and such a joint angle of the middle joint as to cause the calculated ratio to be constant is used as a constraint condition. This makes it possible to readily realize control that allows the seven-axis articulated robot to operate smoothly in a manner similar to that of a human arm.

In order to solve the above problems, another aspect of the present invention is a control program of controlling a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point. The control program causes a computer to perform: calculating a maximum value and a minimum value, which are possible values of a joint angle of the middle joint and which are values to be taken from an initial state at a start of operation of the robot, by performing inverse transformation while setting a joint angle of a distal end side joint among the three joints to 0° (a reference position) or 180° (a maximum displacement position from the reference position); calculating, as an index indicating an assumed elbow angle in a case where a rotational axis of the middle joint is assumed as a shoulder, a ratio of the joint angle of the middle joint in the initial state within a range from the maximum value to the minimum value; and performing inverse transformation using, as a constraint condition, such a joint angle of the middle joint as to cause the calculated ratio to be constant.

In order to solve the above problems, yet another aspect of the present invention is a robot control device configured to control a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point. The robot control device includes: a maximum and minimum value calculator configured to calculate a maximum value and a minimum value, which are possible values of a joint angle of the middle joint and which are values to be taken from an initial state at a start of operation of the robot, by performing inverse transformation while setting a joint angle of a distal end side joint among the three joints to 0° (a reference position) or 180° (a maximum displacement position from the reference position); a ratio calculator configured to calculate, as an index indicating an assumed elbow angle in a case where a rotational axis of the middle joint is assumed as a shoulder, a ratio of the joint angle of the middle joint in the initial state within a range from the maximum value to the minimum value; and an inverse transformation unit configured to perform inverse transformation using, as a constraint condition, such a joint angle of the middle joint as to cause the calculated ratio to be constant.

The above object, other objects, features, and advantages of the present invention will be made clear by the following detailed description of a preferred embodiment with reference to the accompanying drawings.

Advantageous Effects of Invention

The present invention makes it possible to suitably realize control of a seven-axis articulated robot including a mechanism in which rotational axes of three proximal end side joints among seven joints of the robot do not intersect with each other at one point, the control allowing the seven-axis articulated robot to operate smoothly in a manner similar to that of a human arm.

DESCRIPTION OF EMBODIMENTS

Figure 1:
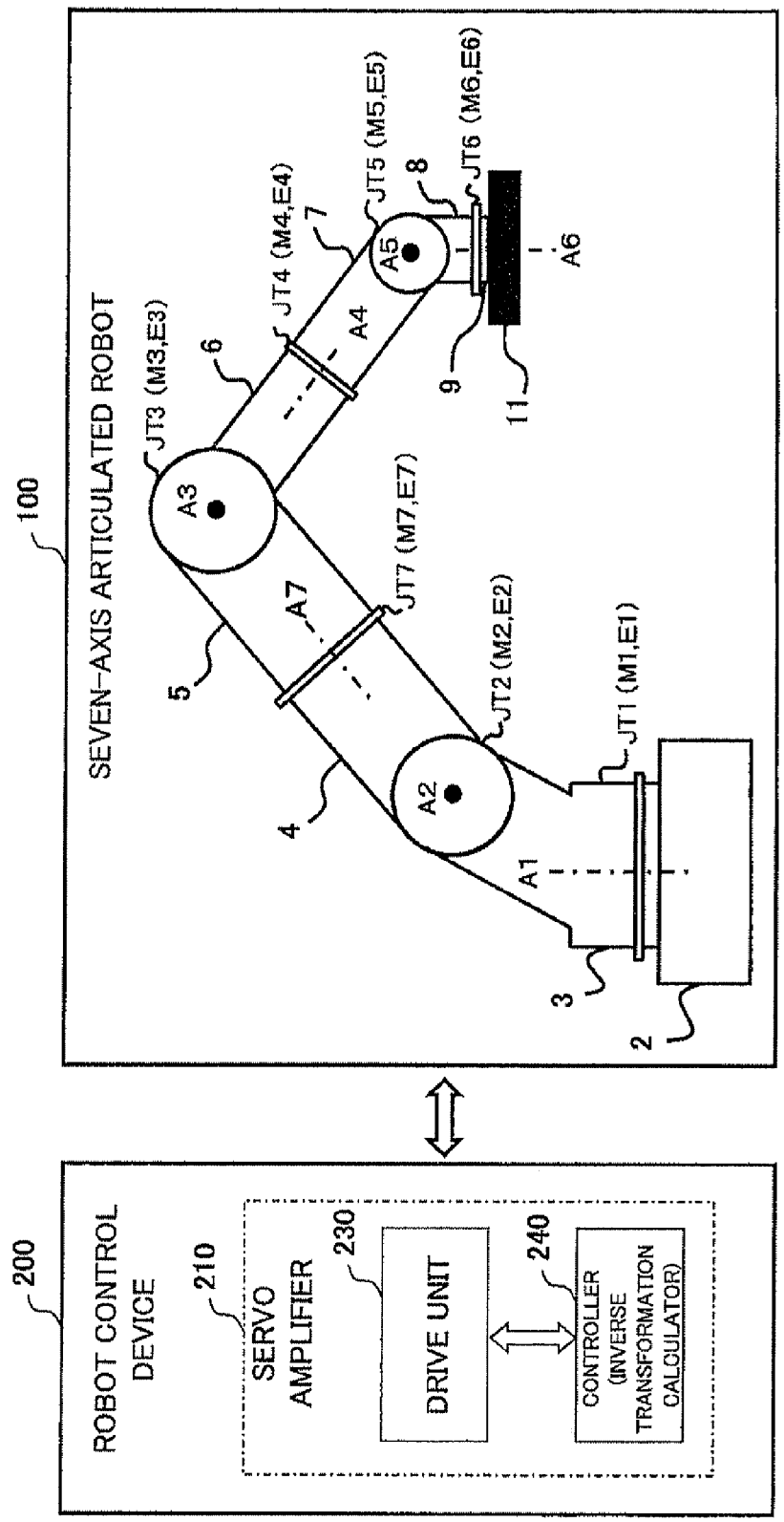
FIG. 1 shows the configuration of a robot system according to an embodiment of the present invention, the robot system including a seven-axis articulated robot and a robot control device.

Hereinafter, a preferred embodiment of the present invention will be described with reference to the accompanying drawings. In the drawings, the same or corresponding components are denoted by the same reference signs, and a repetition of the same description is avoided.

(Concept of Present Invention)

First, the concept of the present invention is described.

Figure 8:
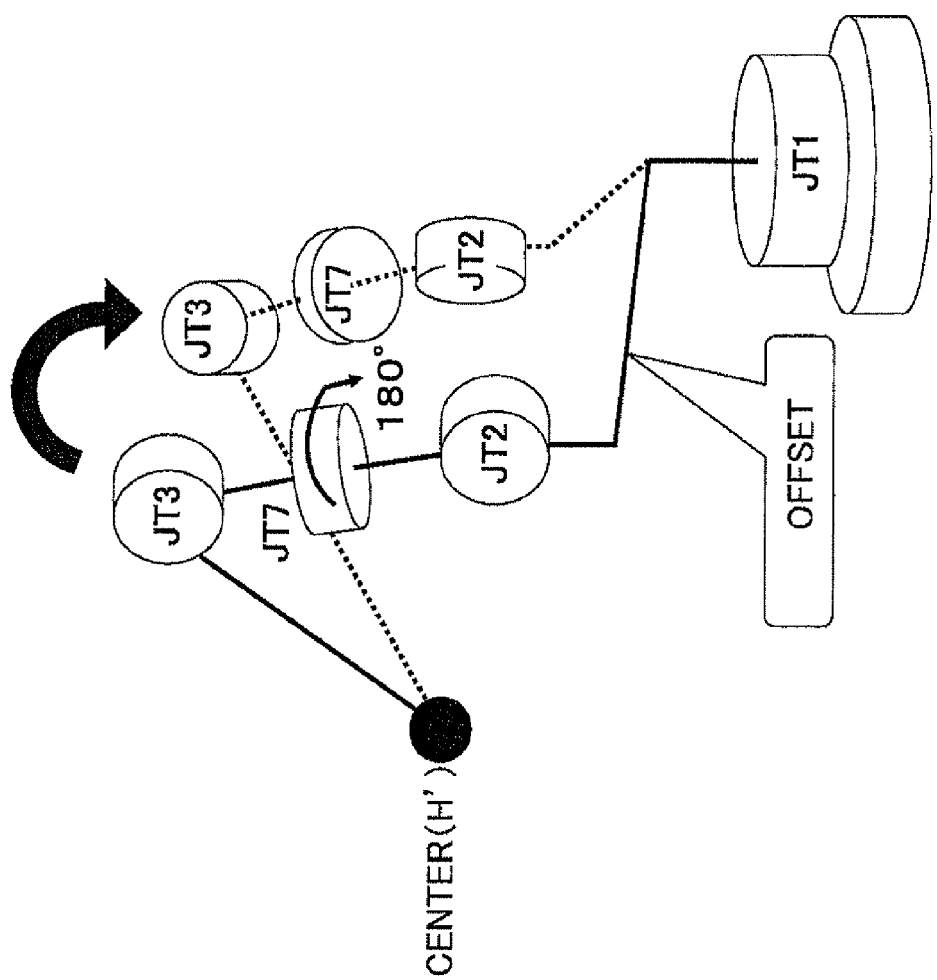
FIG. 8 is a schematic diagram illustrating the concept of the present invention.

FIG. 8 is a schematic diagram illustrating the concept of the present invention. It should be noted that FIG. 8 shows a case where the joints JT4 to JT6 forming the "wrist (W)" are eliminated from the seven-axis articulated robot shown in FIG. 12 in which an offset is set.

Figure 11:
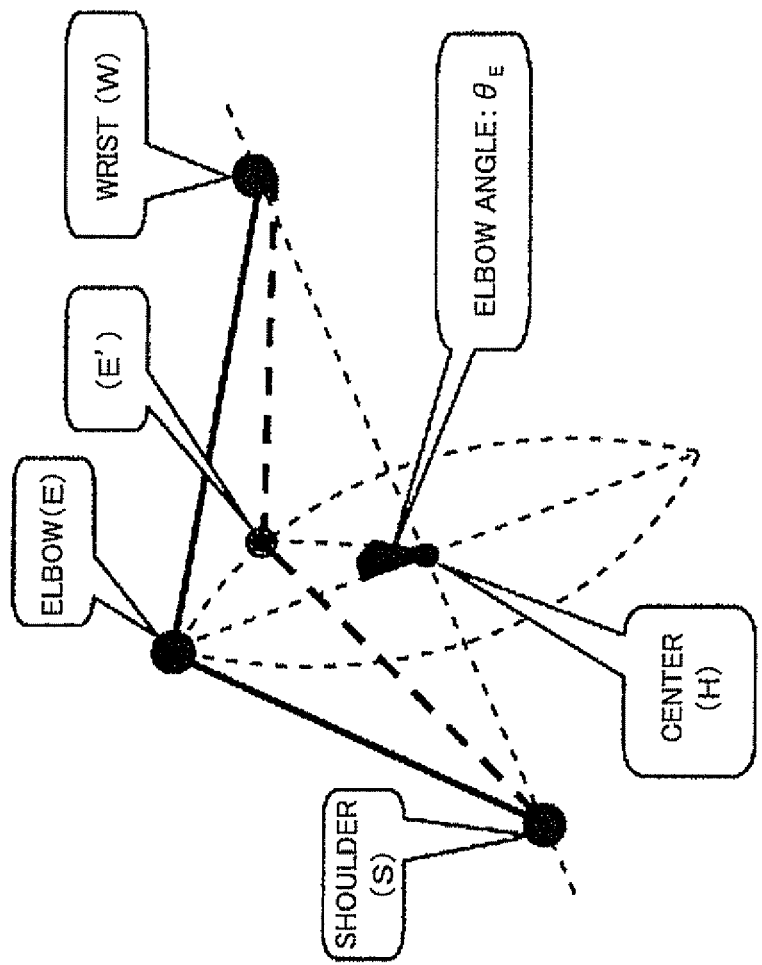
FIG. 11 illustrates an elbow angle defined in the seven-axis articulated robot shown in FIG. 10.

In the seven-axis articulated robot shown in FIG. 8, if the rotational axis of the joint JT2 is defined as an assumed "shoulder (S)" (hereinafter, referred to as an assumed shoulder S'), then smooth motion similar to motion of a human arm is realized by operating the robot in such a manner that the elbow angle θE defined as shown in FIG. 11 (hereinafter, referred to as an assumed elbow angle) is kept constant.

It is understood that if the joint JT7 of the seven-axis articulated robot of FIG. 8 is operated with the positional orientation of the "wrist (W)" (not shown) kept constant, then the joint JT3 forming the "elbow (E)" becomes tilted and the assumed elbow angle is changed. From the behavior of the robot arm at the time, two features as described below are found.

Feature 1: the joint angle of the joint JT2 changes substantially in proportion to changes in the assumed elbow angle whatever the state of the positional orientation of the wrist is.

Feature 2: if the joint angle of the joint JT7 is 0° (i.e., if there is no variation from a reference position), the assumed elbow angle is 0° and the joint angle of the joint JT2 is a minimum (or maximum) value J21 whatever the state of the positional orientation of the wrist is. If the joint angle of the joint JT7 is 180° (i.e., if a maximum variation from the reference position has occurred), the assumed elbow angle is 180° and the joint angle of the joint JT2 is a maximum (or minimum) value J22.

Figure 9:
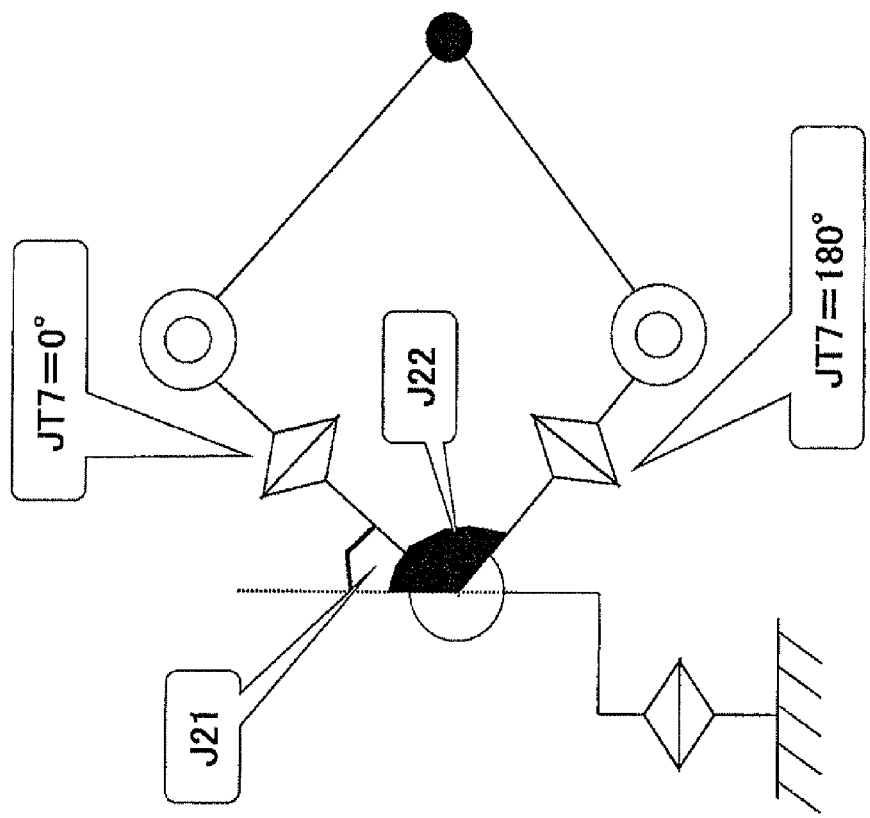
FIG. 9 is a schematic diagram illustrating the concept of the present invention.
Figure 10:
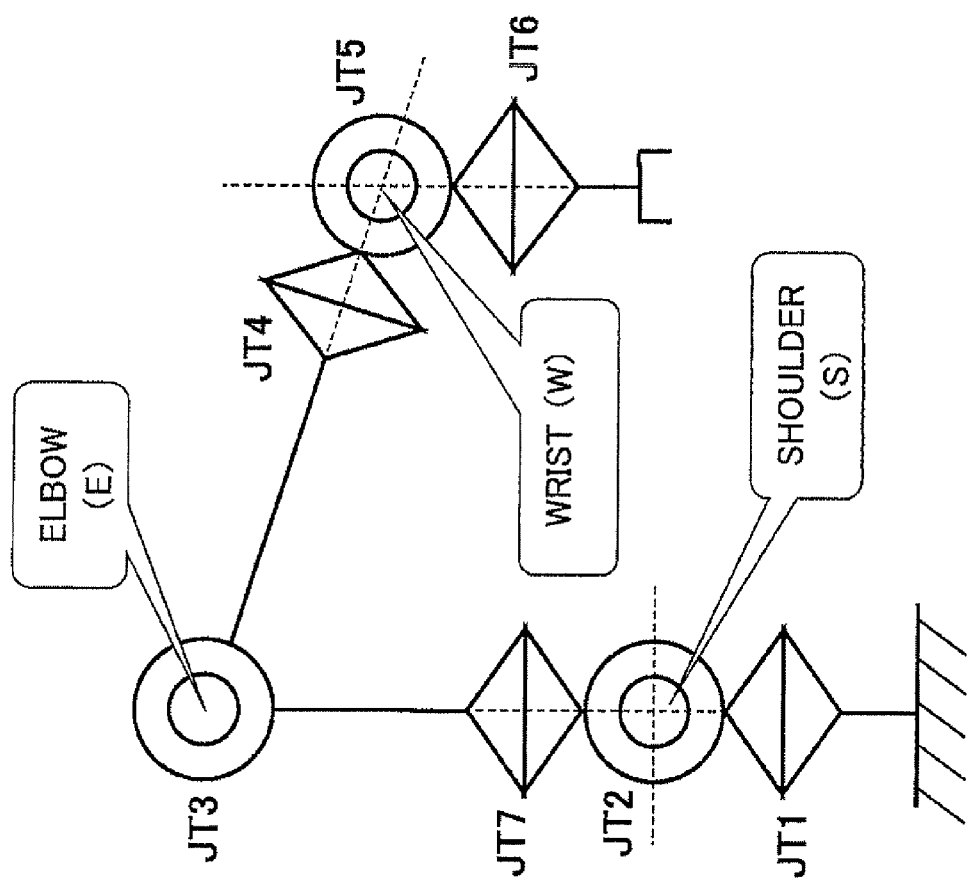
FIG. 10 schematically shows a link structure of a seven-axis articulated robot including a mechanism in which rotational axes of three proximal end side joints JT1, JT2, and JT7 among seven joints of the robot intersect with each other at one point.

That is, in FIG. 9, the assumed elbow angle changes from 0° to 180° in accordance with changes in the joint angle of the joint JT7 from 0° to 180°, and the joint angle of the joint JT2 changes from J21 to J22 substantially in proportion to the changes in the elbow angle.

In view of the above, possible maximum and minimum values of the joint angle of the joint JT2, which are values to be taken from an initial state at the start of operation of the robot, are calculated by performing inverse transformation while setting the joint angle of the joint JT7 to 0° or 180°. Then, the calculated maximum value and minimum value are defined as 100% and 0%, respectively, and a JT2 ratio a indicating the percentage of the joint angle of the joint JT2 at the start of operation of the robot is calculated. The JT2 ratio a is an index corresponding to the elbow angle θE (see FIG. 11) in a case where there is no offset. The inverse transformation is performed by using, as a constraint condition, such a joint angle of the joint JT2 as to cause the calculated JT2 ratio a to be constant.

(Embodiment)

Next, an embodiment of the present invention based on the above-described concept of the present invention is described.

[Seven-Axis Articulated Robot]

FIG. 1 shows the configuration of a robot system according to an embodiment of the present invention, the robot system including a seven-axis articulated robot and a robot control device.

As shown in FIG. 1, a seven-axis articulated robot 100 includes six joints JT1 to JT6 sequentially arranged from the proximal end of the robot to the wrist. The seven-axis articulated robot 100 is configured such that a six-axis articulated robot, whose six joints JT1 to JT6 have respective rotational axes A1 to A6, includes a joint JT7 adding a redundant axis between the joint JT2 and the joint JT3. In the seven-axis articulated robot 100, the seven joints JT1 to JT7 include rotational axes each causing a next joint to turn and rotational axes each causing a next joint to pivot, such that the rotational axes causing turning and the rotational axes causing pivoting are arranged alternately. Although reference signs (JT1 to JT7 and A1 to A7) are assigned to the seven joints and seven rotational axes for the sake of convenience, the reference signs assigned to the seven joints and seven rotational axes may be any reference signs so long as the signs allow the seven joints and seven rotational axes to be distinguished from each other.

Figure 12:
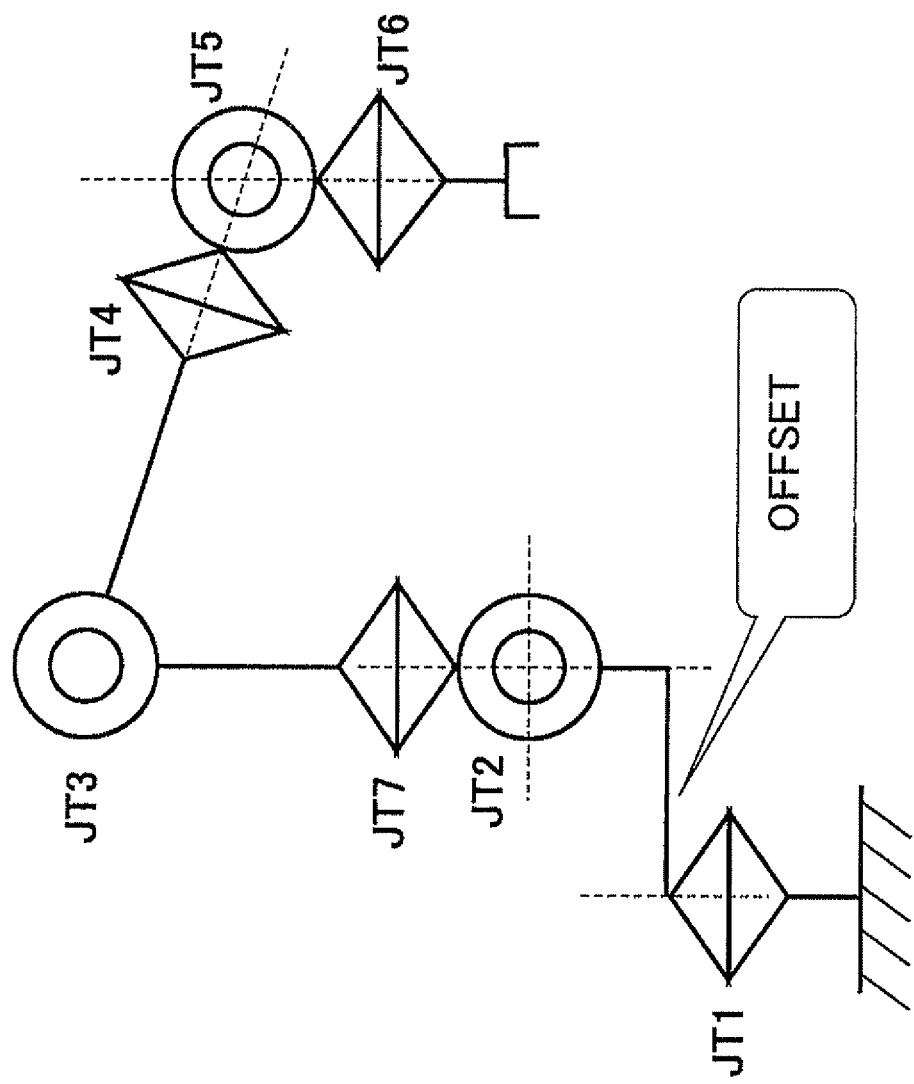
FIG. 12 schematically shows a link structure of a seven-axis articulated robot including a mechanism in which rotational axes of three proximal end side joints JT1, JT2, and JT7 among seven joints of the robot do not intersect with each other at one point.
Figure 13:
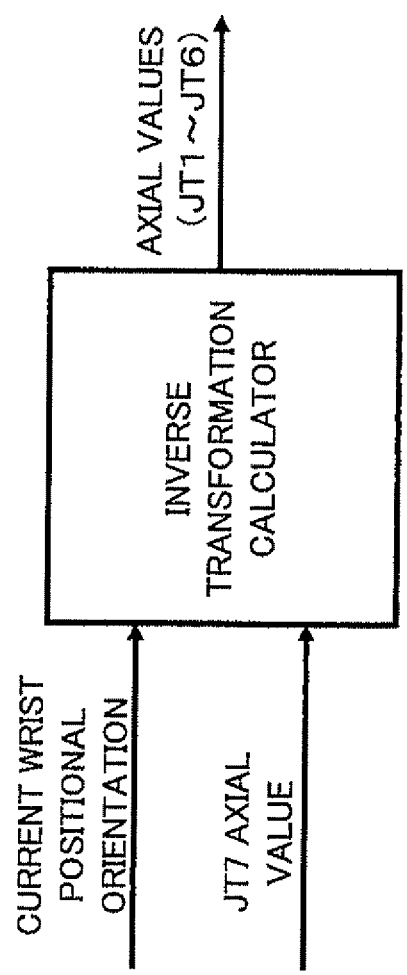
FIG. 13 illustrates inverse transformation of a comparative method.

Similar to the case shown in FIG. 12, the seven-axis articulated robot 100 includes a mechanism in which at least one of the rotational axes of the respective joints JT1, JT2, and JT7 does not intersect with the other rotational axes of the three joints at one point. Specifically, FIG. 1 shows a mechanism in which: an offset is set between the joints JT1 and JT2 for the purpose of increasing the working range of the robot; the rotational axes of the respective joints JT2 and JT7 intersect with each other at one point; and the rotational axis of the joint JT1 does not intersect with the rotational axes of the respective joints JT2 and JT7 at one point. Thus, in the case of a mechanism in which an offset is set, a "shoulder (S)" cannot be precisely defined although a "wrist (W)" and an "elbow (E)" can be defined. Therefore, the vicinity of the rotational axis of the joint JT2 is defined as an "assumed shoulder (S)". It should be noted that an intersection point where the rotational axes of the respective joints JT4, JT5, and JT6 intersect with each other is referred to as the wrist (W), and the rotational axis of the joint JT3 is referred to as the elbow (E). An intersection point where the rotational axes of the respective joints JT2 and JT7 intersect with each other is referred to as the assumed shoulder (S). In the description below, an XYZ orthogonal coordinate system whose origin is the "assumed shoulder (S)" is referred to as a "reference coordinate system"; an XYZ orthogonal coordinate system whose origin is the "wrist (W)" is referred to as a "wrist coordinate system"; a displacement of the origin of the wrist coordinate system relative to the origin of the reference coordinate system is referred to as a "wrist position"; an angular displacement of the wrist coordinate system relative to the reference coordinate system is referred to as a "wrist orientation"; and a portion that mainly affects the wrist orientation is referred to as the "wrist", In the seven-axis articulated robot 100 shown in FIG. 1, all of the rotational axes A4 to A6 intersect with each other at the origin, i.e., at one point, of the wrist coordinate system. Accordingly, portions corresponding to the joints JT4 to JT6 form the wrist. Meanwhile, portions corresponding to the joints JT1 to JT3 and the joint JT7 affect the wrist position.

A turn base 3, arm members (links) 4, 5, 6, 7, 8, and an attachment 9 are installed consecutively on a base 2 in said order. It should be noted that a tool member 11 suitably selected according to various types of work to be performed is detachably attached to a flange face that forms the distal end of the attachment 9. The consecutively installed members 2 to 9 from the base 2 to the attachment 9 are connected to each other such that they are rotatable relative to each other.

The arm members 7 and 8 and the attachment 9 form a human wrist-like structure (hereinafter, referred to as a wrist device) configured to cause the tool member 11 attached to the attachment 9 to perform fine motions. The rotational axes A1, A2, A7, and A3 are used as rotational axes for causing the tool member 11 to turn horizontally, swing, etc., together with the wrist device. The rotational axes A1, A2, A7, and A3 serve as main axes of the seven-axis articulated robot 100. The rotational axes A4 to A6 are set for the wrist device, and serve as wrist axes of a so-called RBR (Roll-Bend-Roll) type. It should be noted that the wrist axes of the wrist device are not limited to the RBR type, but may be a so-called BBR (Bend-Bend-Roll) type or a 3R (Roll-Roll-Roll) type.

Servomotors M1 to M7 and position detectors E1 to E7 are provided at the joints JT1 to JT7. Each of the position detectors E1 to E7 is configured as a rotary encoder, for example. When the servomotors M1 to M7 are driven, allowable rotation around the rotational axes A1 to A7 is performed at the joints JT1 to JT7, respectively. It should be noted that the servomotors M1 to M7 can be driven independently of each other. When the servomotors M1 to M7 are driven, the position detectors E1 to E7 detect rotational positions of the respective servomotors M1 to M7 around the rotational axes A1 to A7.

Figure 2:
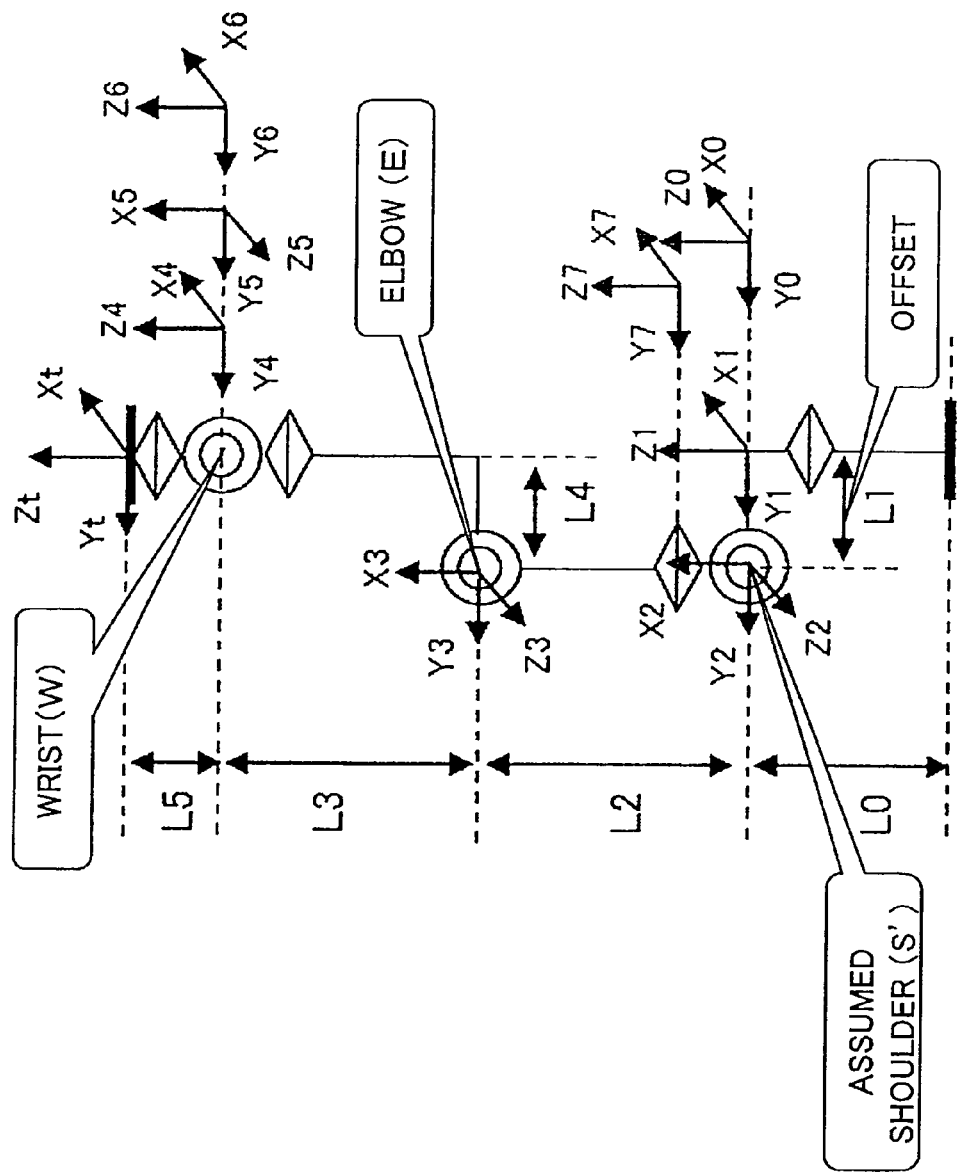
FIG. 2 schematically shows a link structure of the seven-axis articulated robot of FIG. 1.

FIG. 2 schematically shows a link structure of the seven-axis articulated robot 100 of FIG. 1.

At the joint JT1 where the base 2 and the turn base 3 are connected, rotation (turning) of the turn base 3 relative to the base 2 around the rotational axis Al is allowed. It should be noted that, at the center of the top surface of the base 2, an origin O of the reference coordinate system (orthogonal coordinate system formed by an X0 axis, a Y0 axis, and a Z0 axis) is set as the assumed shoulder (S') (see FIG. 2). Also, at the joint JT1, a joint coordinate system (orthogonal coordinate system formed by an X1 axis, a Y1 axis, and a Z1 axis) of the joint JT1 is set.

At the joint JT2 where the top end of the turn base 3 is connected to one end of the arm member 4, rotation (pivoting) of the arm member 4 relative to the turn base 3 around the rotational axis A2 is allowed. It should be noted that, at the joint JT2, a joint coordinate system (orthogonal coordinate system formed by an X2 axis, a Y2 axis, and a Z2 axis) of the joint JT2 is set. In a case where the joints are in a state shown in FIG. 2, a distance in the vertical direction from the origin of the joint coordinate system of the joint JT2 is indicated as a link length L0; and a distance in the horizontal direction (to the left in the drawing of FIG. 2) between the origin of the joint coordinate system of the joint JT1 and the origin of the joint coordinate system of the joint JT2 is indicated as a link length L1.

At the joint JT7 where the other end of the arm member 4 is connected to one end of the arm member 5, rotation (turning) of the arm member 5 relative to the arm member 4 around the rotational axis A7 is allowed. It should be noted that, at the joint JT7, a joint coordinate system (orthogonal coordinate system formed by an X7 axis, a Y7 axis, and a Z7 axis) of the joint JT7 is set.

At the joint JT3 where the other end of the arm member 5 is connected to one end of the arm member 6, rotation (pivoting) of the arm member 6 relative to the arm member 5 around the rotational axis A3 is allowed. It should be noted that, at the joint JT3, a joint coordinate system (orthogonal coordinate system formed by an X3 axis, a Y3 axis, and a Z3 axis) of the joint JT3 is set. In the case where the joints are in the state shown in FIG. 2, a distance in the vertical direction between the origin of the joint coordinate system of the joint JT2 and the origin of the joint coordinate system of the joint JT3 is indicated as a link length L2.

At the joint JT4 where the other end of the arm member 6 is connected to one end of the arm member 7, rotation (turning) of the arm member 7 relative to the arm member 6 around the rotational axis A4 is allowed. It should be noted that, at the joint JT4, a joint coordinate system (orthogonal coordinate system formed by an X4 axis, a Y4 axis, and a Z4 axis) of the joint JT4 is set. In the case where the joints are in the state shown in FIG. 2, a distance in the vertical direction between the origin of the joint coordinate system of the joint JT3 and the origin of the joint coordinate system of the joint JT4 is indicated as a link length L3, and a distance in the horizontal direction between the origin of the joint coordinate system of the joint JT3 and the origin of the joint coordinate system of the joint JT4 is indicated as a link length L4.

At the joint JT5 where the other end of the arm member 7 is connected to one end of the arm member 8, rotation (pivoting) of the arm member 8 relative to the arm member 7 around the rotational axis A5 is allowed. It should be noted that, at the joint JT5, a joint coordinate system (orthogonal coordinate system formed by an X5 axis, a Y5 axis, and a Z5 axis) of the joint JT5 is set.

At the joint JT6 where the other end of the arm member 8 is connected to one end of the attachment 9, rotation (turning) of the attachment 9 relative to the arm member 8 around the rotational axis A6 is allowed. It should be noted that, at the joint JT6, an orthogonal coordinate system formed by an X6 axis, a Y6 axis, and a Z6 axis is set as a joint coordinate system of the joint JT6. The origin of the orthogonal coordinate system formed by the X6 axis, the Y6 axis, and the Z6 axis is a point where the rotational axes A4 to A6 intersect with each other. In the case where the joints are in the state shown in FIG. 2, a distance in the vertical direction between the wrist and the origin of the joint coordinate system of the joint JT5 is indicated as a link length L5.

When the base 2 is properly installed on a floor, the rotational axis A1, which is the nearest rotational axis to the base 2, is oriented in the vertical direction (direction extending from the base 2 to the joint JT1); the rotational axis A2 is oriented in the horizontal direction (direction parallel to the floor surface; the rotational axis A7 is oriented in a direction orthogonal to the rotational axis A2, the direction being the extending direction of the arm member 4; the rotational axis A3 is oriented in a direction orthogonal to the rotational axis A7, the direction being the horizontal direction; the rotational axis A4 is oriented in a direction orthogonal to the rotational axis A3, the direction being the extending direction of the arm member 6; the rotational axis A5 is oriented in a direction orthogonal to the rotational axis A4, the direction being the horizontal direction; and the rotational axis A6 is oriented in a direction orthogonal to the rotational axis A5, the direction being the extending direction of the arm member 8. Thus, the rotational axes A1 to A7 are arranged such that the rotational axes of every two adjoining joints are perpendicular to each other.

[Robot Control Device]

A robot control device 200 is disposed near the base 2 of the articulated robot 100. It should be noted that the robot control device 200 may be either disposed at a remote distance from the articulated robot 100 or physically connected to the articulated robot 100 in a detachable manner. The robot control device 200 includes servo amplifiers 210. The servo amplifiers 210 perform servo control of the respective servomotors M1 to M6 provided at the joints JT1 to JT6 of the articulated robot 100, the servo control causing the tool member 11 attached to the attachment 9 to move along a desired path to be in a desired positional orientation.

Each servo amplifier 210 includes a drive unit 230 and a controller 240. It should be noted that the controller 240 may be provided outside of the servo amplifier 210. In other words, the servo amplifiers 210 may only include respective drive units 230.

The drive units 230 are power converters configured to drive the respective servomotors M1 to M6. Each drive unit 230 includes a rectifier circuit and an inverter circuit, for example. Although the multiple servo amplifiers 210 are provided such that an individual servo loop is formed for each of the servomotors M1 to M6, an alternative configuration may be adopted, in which a single servo amplifier 210 drives the servomotors M1 to M6 in an integrated manner. In this case, only the drive unit 230 is provided for each of the servomotors M1 to M6.

The controller 240 manages control of the entire robot control device 200 including the servo amplifier 210. The controller 240 includes a microcontroller, CPU, MPU, PLC, DSP, ASIC, or FPGA, for example. It should be noted that the controller 240 may be configured as multiple controllers performing distributed control in cooperation with each other. For example, a system may be configured, such that a CPU performs interface processing with a superordinate controller and a DSP performs elementary operations (position loop operation, speed loop operation, and current loop operation) of the servo amplifier 210.

The robot control device 200 is connectable to, for example, a teach pendant. An operator uses the teach pendant to perform a teaching operation. The controller 240 calculates a target position where the tool member 11 is to be positioned, based on a teaching operation and an operation program created by, for example, an offline tool. Further, the controller 240 performs inverse transformation of coordinate data of the target position, thereby calculating joint angles θ1 to θ7 necessary for moving the tool member 11 to the target position. Then, based on deviations between the calculated joint angles θ1 to θ7 and rotational positions detected by the respective position detectors E1 to E7 when the power is turned ON, the controller 240 calculates command values specifying operating amounts of the respective servomotors provided at the joints JT1 to JT7, and supplies the command values to the respective servomotors. As a result, the tool member 11 is moved to the target position.

When the robot control device 200 performs inverse transformation for the seven-axis articulated robot 100, the wrist axes (A4 to A6) which serve to determine the orientation of the wrist are temporarily ignored. Then, one of the remaining four rotational axes A1, A2, A7, and A3 which also serve to determine the position of the wrist (e.g., the rotational axis A7) is set as a redundant axis, and the other three rotational axes (e.g., rotational axes A1 to A3) are set as main axes. Joint angles of the respective joints including these main axes are used as unknown parameters.

Figure 3:
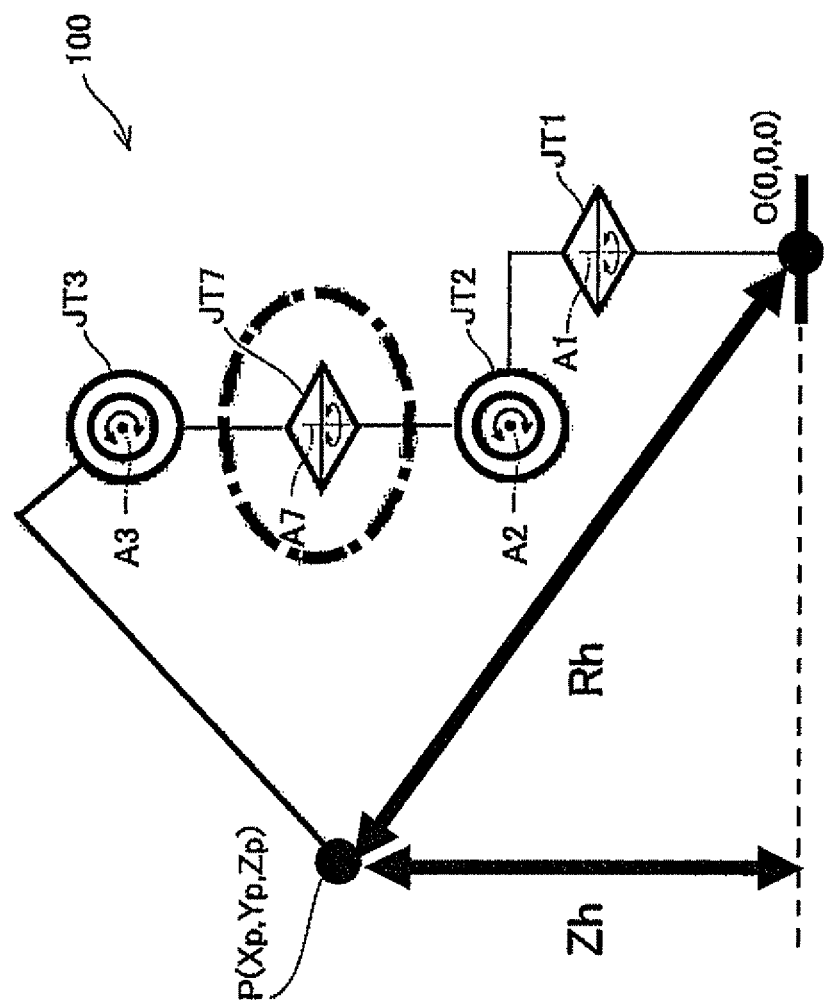
FIG. 3 is a conceptual diagram illustrating inverse transformation of the seven-axis articulated robot shown in FIG. 1.

As shown in FIG. 3, a linear distance between the origin O (0, 0, 0) of the reference coordinate system and a position P of the wrist of the seven-axis articulated robot 100 is indicated as Rh, and a distance of the position P of the wrist in the Z-axis direction in the reference coordinate system (i.e., a distance from the proximal end to the wrist in the extending direction of the nearest rotational axis to the proximal end) is indicated as Zh. When the position P of the wrist in the reference coordinate system is represented as (Xp, Yp, Zp), equations shown below hold true for Rh and Zh.

$$Rh^2 = Xp^2 + Yp^2 + Zp^2 \quad \text{Equation (1)}$$

$$Zh = Zp \quad \text{Equation (2)}$$

Other than the above Equation (1) and Equation (2), Rh and Zh can be represented by using the length of each link of the seven-axis articulated robot 100 and the joint angles θ1, θ2, θ3, and θ7 of the joints JT1 to JT3 and JT7. Based on these, a biquadratic equation shown below can be obtained for a parameter t (=tanθ3).

$$t^4 + a \cdot t^3 + b \cdot t^2 + c \cdot t + d = 0 \quad \text{Equation (3)}$$

The joint angle θ3 can be obtained by solving the above Equation (3), which is a biquadratic equation. Based on the obtained joint angle θ3, the joint angle θ1 and the joint angle θ2 are uniquely obtained.

[Method of Controlling Seven-Axis Articulated Robot]

Figure 4:
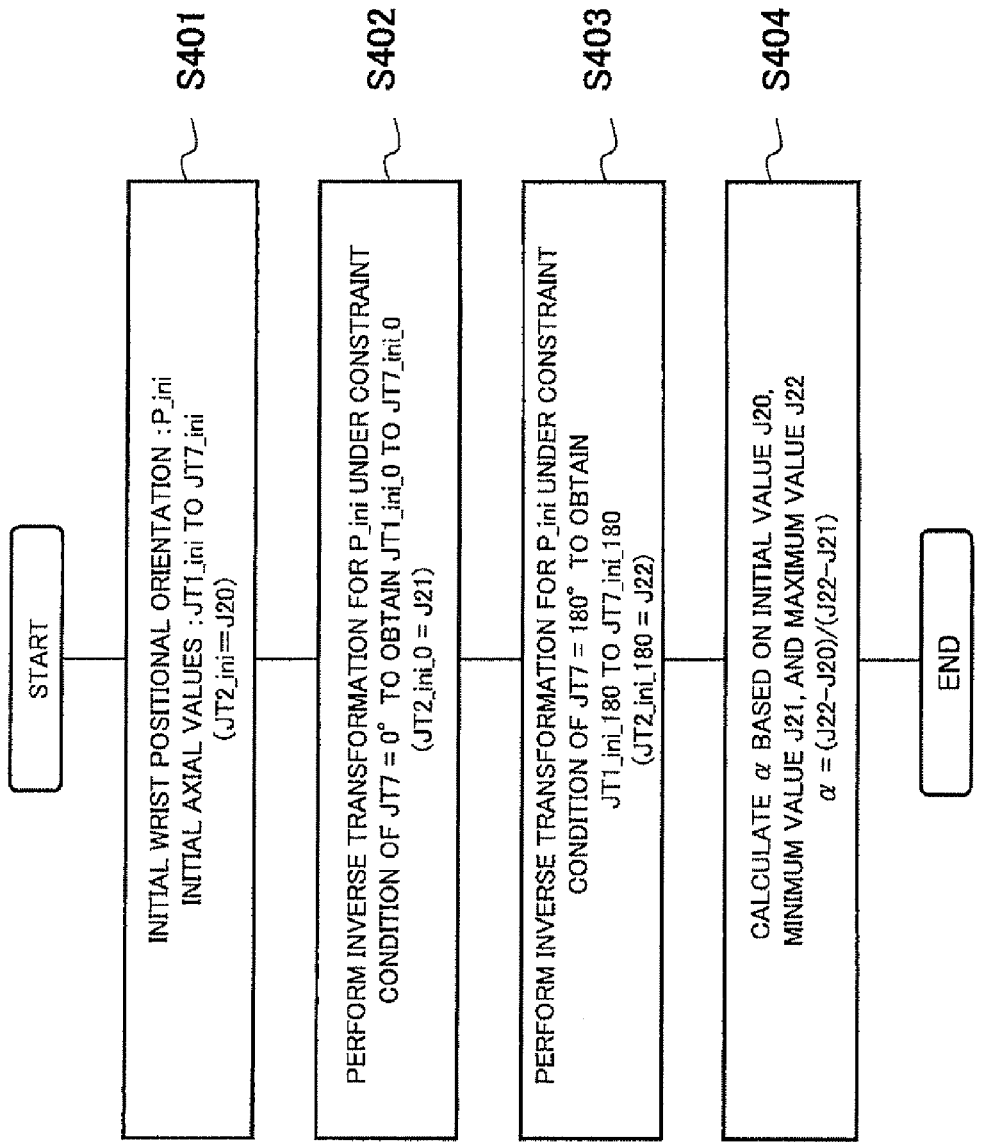
FIG. 4 is a flowchart showing control steps performed at the start of operation of the robot according to the embodiment of the present invention.

FIG. 4 is a flowchart showing control steps performed at the start of operation of the robot according to the embodiment of the present invention.

First, it is assumed that the robot control device 200 has recognized an initial wrist positional orientation P_ini in an initial state at the start of operation of the robot and initial axial values JT1_ini, JT2_ini, ..., JT7_ini, which are joint angles in the initial state at the start of operation of the robot (step S401). It should be noted that the initial joint angle JT2_ini of the joint JT2 is referred to as an initial value J20.

Next, the robot control device 200 performs inverse transformation for the initial wrist positional orientation P_ini under a constraint condition that the joint angle of the joint JT7 is 0°, thereby obtaining joint angles JT1_ini__0, JT2_ini__0, JT7_ini__0 (step S402). It should be noted that, among the obtained joint angles, the joint angle JT2_ini__0 of the joint JT2 is referred to as a minimum value J21 (first minimum value).

Subsequently, the robot control device 200 performs inverse transformation for the initial wrist positional orientation P_ini under a constraint condition that the joint angle of the joint JT7 is 180°, thereby obtaining joint angles JT1_ini__180, JT2_ini__180, ..., JT7_ini__180 (step S403). It should be noted that, among the obtained joint angles, the joint angle JT2_ini__180 of the joint JT2 is referred to as a maximum value J22 (first maximum value).

By using the initial value J20 obtained in step S401, the minimum value J21 obtained in step S402, and the maximum value J22 obtained in step S403, the robot control device 200 calculates a JT2 ratio a with an equation shown below. The JT2 ratio a indicates, within a possible joint angle range (=J21−J22) of the joint JT2 in the initial positional orientation, a degree of closeness of the initial value J20 to the minimum value J21 (step S404).

$$\alpha = (J22 - J20)/(J22 - J21) \quad \text{Formula (4)}$$

It should be noted that if the initial value J20 is closest to the minimum value J21 (i.e., J20=J21), the JT2 ratio α is 1 (100%). Also, if the initial value J20 is most distant from the minimum value J21 (i.e., J20=J22), the JT2 ratio α is 0 (0%). The assumed elbow angle can be kept substantially constant by keeping the JT2 ratio α substantially constant.

Figure 5:
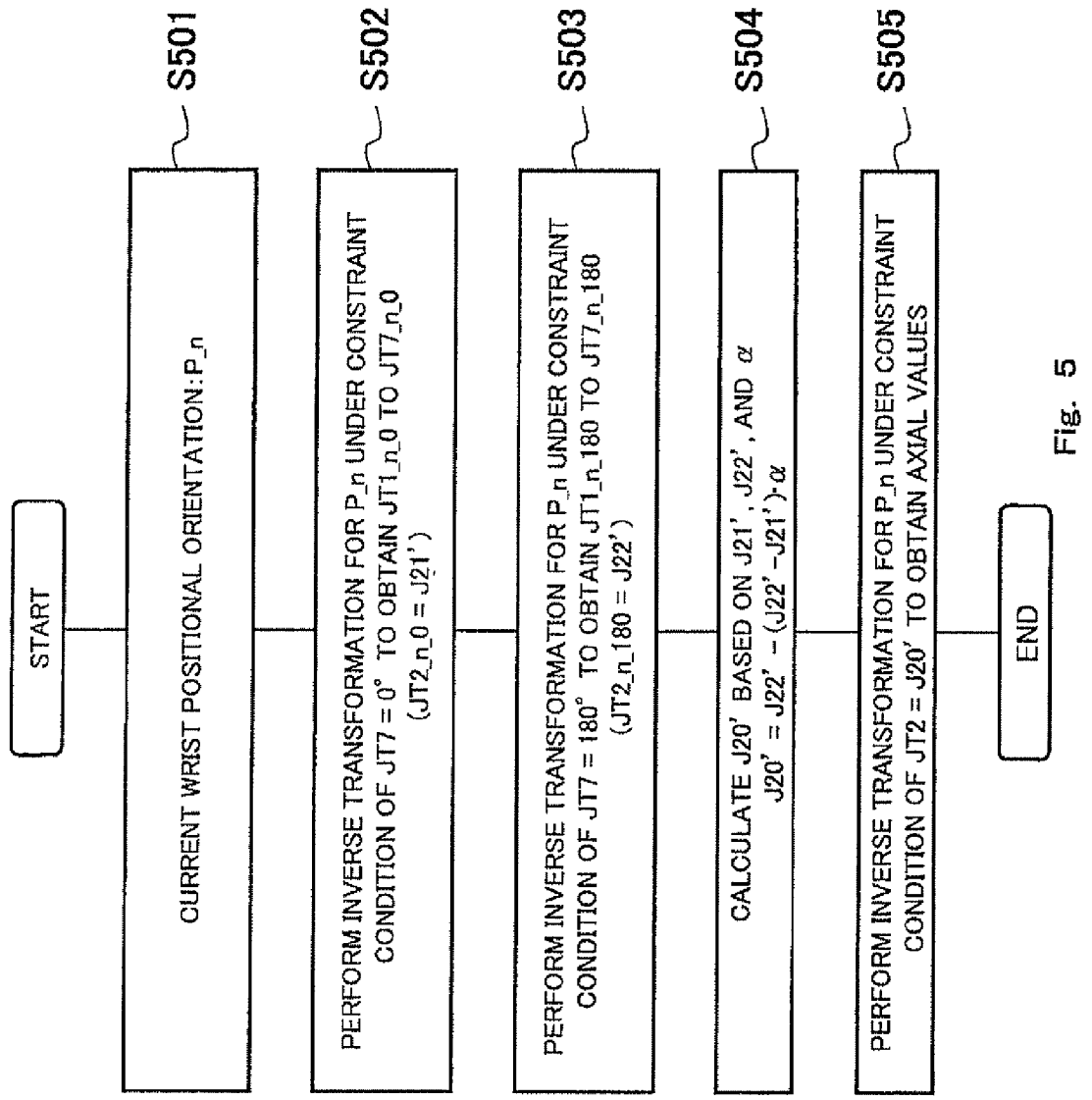
FIG. 5 is a flowchart showing control steps performed when the robot is in operation according to the embodiment of the present invention.

FIG. 5 is a flowchart showing control steps performed when the robot is in operation according to the embodiment of the present invention.

First, it is assumed that the robot control device 200 has recognized, as an initial value, a current wrist positional orientation P_n, which is the current wrist positional orientation when the robot is in operation (step S501).

Then, the robot control device 200 performs inverse transformation for the current wrist positional orientation P_n under a constraint condition that the joint angle of the joint JT7 is 0°, thereby obtaining joint angles JT1_n__0, JT2_n__0, JT7_n__0 (step S502). It should be noted that, among the obtained joint angles, the joint angle JT2_n__0 of the joint JT2 is referred to as a minimum value J21' (second minimum value).

Next, the robot control device 200 performs inverse transformation for the current wrist positional orientation P_n under a constraint condition that the joint angle of the joint JT7 is 180°, thereby obtaining joint angles JT1_n__180, JT2_n__180, ..., JT7_n__180 (step S503). It should be noted that, among the obtained joint angles, the joint angle JT2_n_180 of the joint JT2 is referred to as a maximum value J22' (second maximum value).

Subsequently, by using the JT2 ratio α obtained in step S404, the minimum value J21' obtained in step S502, and the maximum value J22' obtained in step S503, the robot control device 200 calculates a target value J20' of the joint angle of the joint JT2 with an equation shown below (step S504).

$$J20' = J22' - (J22' - J21') \cdot \alpha \quad \text{Formula (5)}$$

Then, the robot control device 200 performs inverse transformation under a constraint condition that the target value J20' obtained in step S504 is the joint angle of the joint JT2, thereby calculating axial values (i.e., joint angles) of the remaining joints JT1, JT3, JT4, JT5, JT6, and JT7 (step S505).

The above-described steps S501 to S505 are repeated from when the wrist is in the initial positional orientation until the wrist is in the target positional orientation. As a result, the JT2 ratio a is kept constant, Consequently, even in the seven-axis articulated robot including the mechanism in which the rotational axes of the respective joints JT1, JT2, and JT7 do not intersect each other at one point, smooth motion of the assumed shoulder in which the assumed elbow angle is kept constant can be readily realized.

[Simulation Results]

Hereinafter, results of simulating the control method of keeping the JT2 ratio a substantially constant according to the embodiment of the present invention are described with reference to FIG. 6 and FIG. 7.

Figure 6:
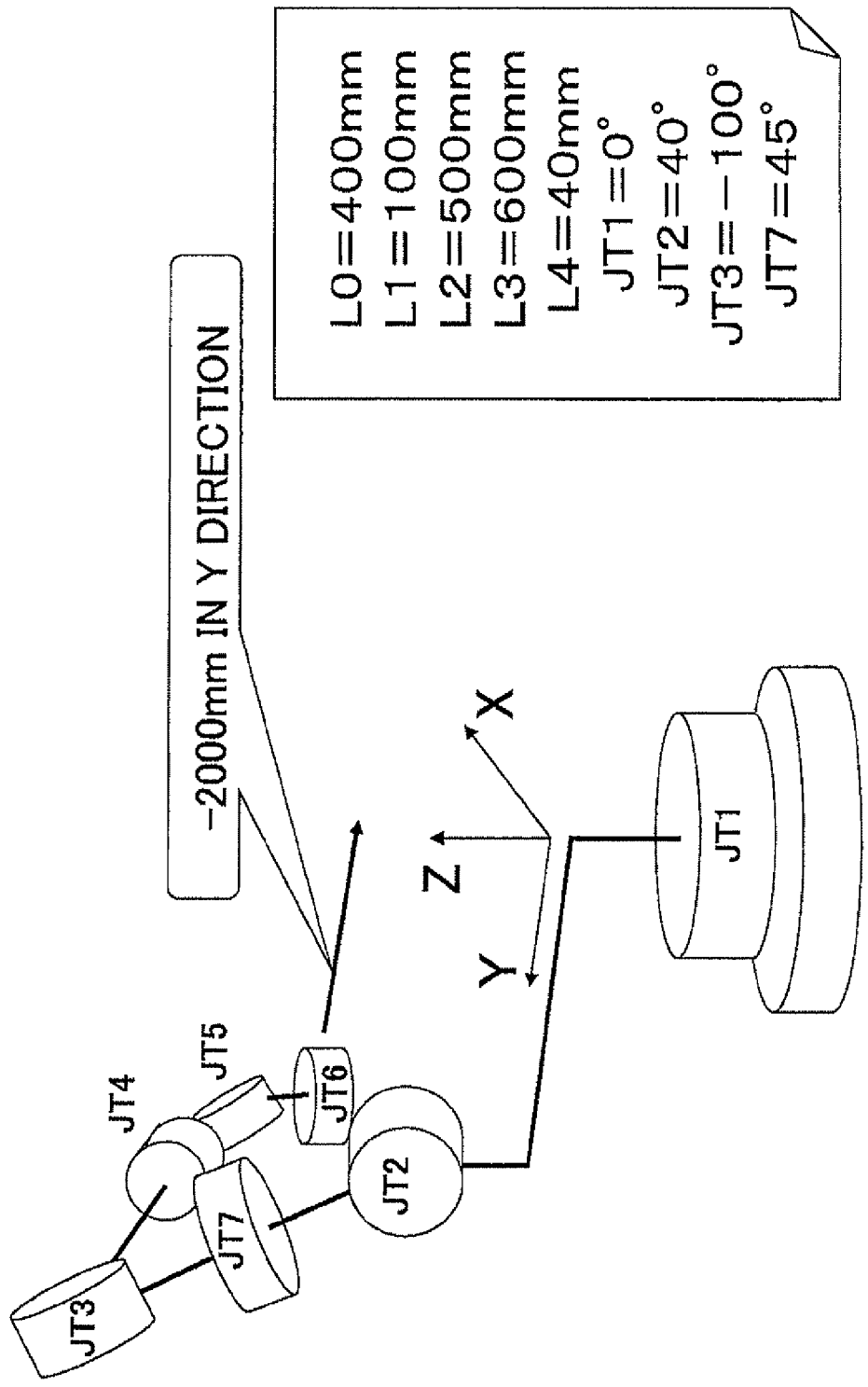
FIG. 6 is a conceptual diagram illustrating simulation conditions for a present scheme.

FIG. 6 is a conceptual diagram illustrating simulation conditions for the control method of keeping the JT2 ratio a substantially constant according to the embodiment of the present invention (hereinafter, the control method according to the embodiment of the present invention is referred to as the present scheme). The respective link lengths of the seven-axis articulated robot 100 are set as follows: the link length L0 is 400 mm; the link length L1 is 100 mm; the link length L2 is 500 mm; the link length L3 is 600 mm; and the link length L4 is 40 mm. The simulation conditions in the present scheme are such that when the seven-axis articulated robot 100 is in its initial state, the joint angle of the joint JT1 is 0°; the joint angle of the joint JT2 is 40°; the joint angle of the joint JT3 is −100°; and the joint angle of the joint JT7 is −45°, and such that the wrist of the seven-axis articulated robot 100 in the initial state is moved by 2000 mm in the Y-axis negative direction in a reference coordinate system shown in FIG. 6.

Figure 7A:
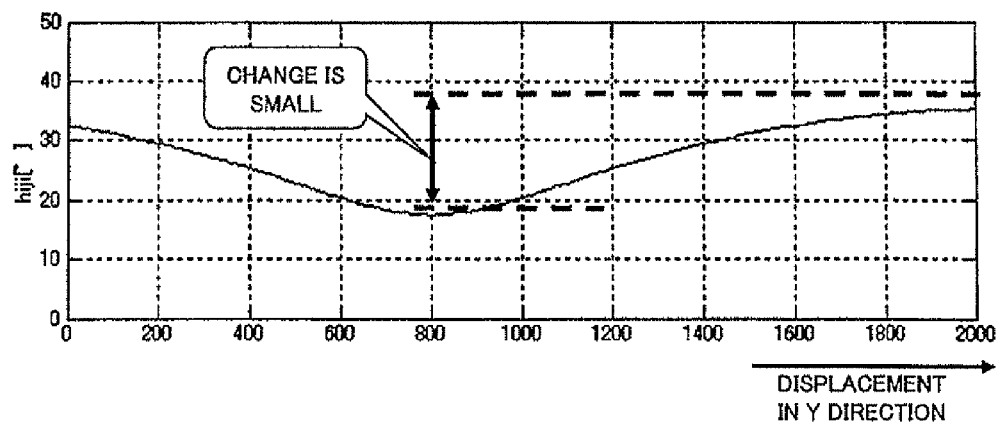
FIG. 7A is a graph showing changes in an assumed elbow angle according to the present scheme.
Figure 7B:
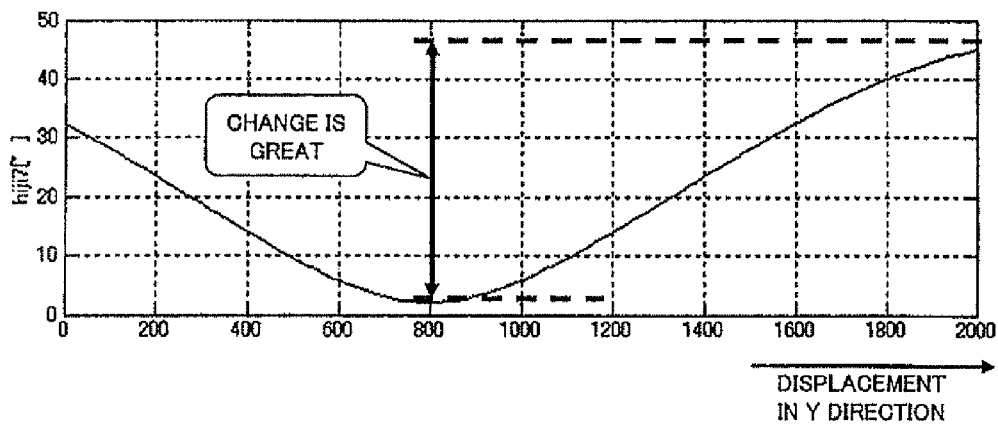
FIG. 7B is a graph showing changes in an elbow angle according to a comparative method.
Figure 7C:
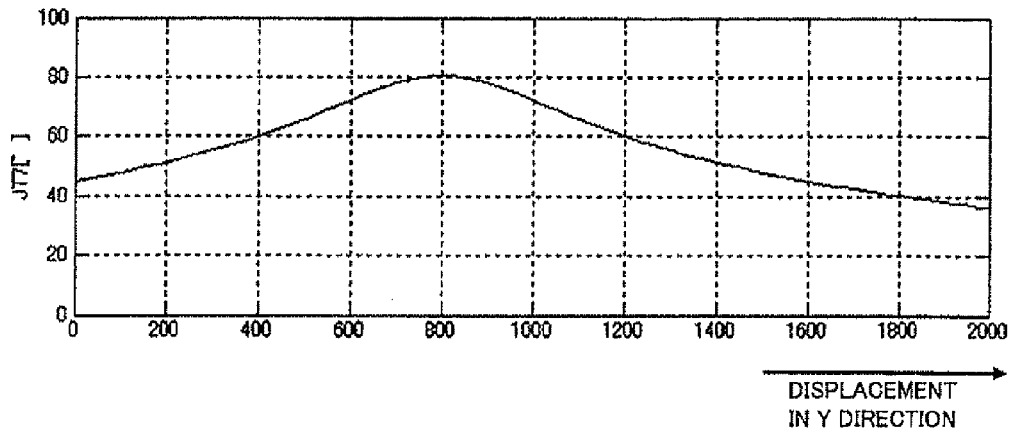
FIG. 7C is a graph showing, for reference, changes in the joint angle of a joint JT7 according to the present scheme.

FIGS. 7A to 7C are graphs, in which simulation results of the present scheme carried out under the simulation conditions shown in FIG. 6 are compared to simulation results obtained through a comparative method. As the comparative method compared to the present scheme, a control method in which the joint angle of the joint JT7 is fixed (hereinafter, simply referred to as the comparative method) was carried out under the same simulation conditions. It should be noted that FIG. 7A is a graph showing changes in the assumed elbow angle according to the present scheme; FIG. 7B is a graph showing changes in the elbow angle according to the comparative method; and FIG. 7C is a graph showing, for reference, changes in the joint angle of the joint JT7 according to the present scheme.

It is understood from the comparison between FIG. 7A and FIG. 7B that the changes in the elbow angle can be made smaller with the present scheme than with the comparative method. Moreover, it is understood from FIG. 7C that, in the present scheme, the joint angle of the joint JT7 changes in such a manner as to cause the elbow angle to be constant.

[Variation]

The seven-axis articulated robot 100 may include more than seven axes. Examples of such cases include: a case where the entire robot is configured to run and includes a rotational axis of a motor for the running; and a case where there is a rotational axis of an unused joint between the joint JT7 and the joint JT3, or between the joint JT3 and the fourth joint, for example. That is, the seven-axis articulated robot 100 may substantially include seven axes.

The JT2 ratio a may alternatively be an index indicating a degree of closeness of the initial value J20 to the maximum value J22 as shown in an equation below.

$$\alpha = (J21 - J20)/(J22 - J21) \qquad \text{Formula (6)}$$

The offset set between the joint JT1 and the joint JT2 is not limited to an L-shaped offset bent at a right angle as shown in FIG. 2. As an alternative example, the offset may be in the form of a straight line inclined diagonally between the joint JT1 and the joint JT2.

Instead of setting the offset between the joints JT1 and JT2, an offset may be set between the joints JT2 and JT7, or an offset may be set between the joints JT1 and JT2 as well as between the joints JT2 and JT7. That is, the seven-axis articulated robot 100 is merely required to include a mechanism in which at least one of the rotational axes of the respective joints JT1, JT2, and JT7 does not intersect with the other rotational axes of the three joints at one point. Examples of such a mechanism include: a mechanism in which, as shown in FIG. 2, the rotational axes of the respective joints JT2 and JT7 intersect with each other at one point, but the rotational axis of the joint JT1 does not intersect with the rotational axes of the respective joints JT2 and JT7; a mechanism in which the rotational axes of the respective joints JT1 and JT2 intersect with each other at one point, but the rotational axis of the joint JT7 does not intersect with the rotational axes of the respective joints JT1 and JT2; and a mechanism in which none of the rotational axes of the joints JT1, JT2, and JT7 intersect with each other at one point.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The present invention is useful to realize control of a seven-axis articulated robot including a mechanism in which rotational axes of three proximal end side joints among seven joints of the robot do not intersect with each other at one point, the control allowing the seven-axis articulated robot to operate smoothly in a manner similar to that of a human arm.

REFERENCE SIGNS LIST 2 base
3 turn base
4 to 8 arm member
9 attachment
10 wrist device
11 tool member
JT1 to JT7 joint
A1 to A7 rotational axis
M1 to M7 servomotor
E1 to E7 position detector
L0 to L5 link length
100 seven-axis articulated robot
200 robot control device
210 servo amplifier
230 drive unit
240 controller

The invention claimed is:

1. A method of controlling a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point, the method comprising:

detecting, via at least one detector, a position of the robot;

calculating, via a controller, a first maximum value and a first minimum value, which are possible values of a joint angle of a middle joint among the three proximal end side joints and which are values to be taken from an initial state at a start of operation of the robot, by performing inverse transformation while setting a joint angle of a distal end side joint among the three proximal end side joints to 0° (a reference position) or 180° (a maximum displacement position from the reference position);

calculating, via the controller, as an index indicating an assumed elbow angle, a ratio of the joint angle of the middle joint in the initial state within a range from the first maximum value to the first minimum value, the joint angle of the middle joint that causes the calculated ratio to be constant being used as a constraint condition;

performing inverse transformation via the controller using, as the constraint condition, the joint angle of the middle joint among the three proximal end side joints that causes the assumed elbow angle to be constant in a case where a rotational axis of the middle joint is assumed as a shoulder; and controlling, via the controller, the seven-axis articulated robot to move a tool member to a target position.

2. The method of controlling a seven-axis articulated robot according to claim 1, wherein a step of calculating the constraint condition includes:

calculating a second maximum value and a second minimum value which are possible values of a current joint angle of the middle joint when the robot is in operation, by performing inverse transformation while setting the joint angle of the distal end side joint to 0° (the reference position) or 180° (the maximum displacement position from the reference position);

calculating a target value of the current joint angle of the middle joint when the robot is in operation, based on the calculated second maximum value, the calculated second minimum value, and the calculated ratio; and applying the calculated target value to the joint angle of the middle joint, the joint angle being used as the constraint condition when performing the inverse transformation.

3. A non-transitory, computer-readable storage medium storing a computer-executable control program which causes an operation of controlling a seven-axis articulated robot to be executed in a computer, the robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point, the operation comprising:

detecting a position of the robot;

calculating a maximum value and a minimum value, which are possible values of a joint angle a middle joint among the three proximal end side and which are values to be taken from an initial state at a start of operation of the robot, by performing inverse transformation while setting a joint angle of a distal end side joint among the three proximal end side joints to 0° (a reference position) or 180° (a maximum displacement position from the reference position);

calculating, as an index indicating an assumed elbow angle in a case where a rotational axis of the middle joint is assumed as a shoulder, a ratio of the joint angle of the middle joint in the initial state within a range from the maximum value to the minimum value;

performing inverse transformation using, as a constraint condition, such a joint angle of the middle joint as to cause the calculated ratio to be constant; and controlling the seven-axis articulated robot to move a tool member to a target position.

4. A robot control device configured to control a seven-axis articulated robot including seven joints sequentially arranged from a proximal end of the robot to a distal end of the robot, the seven joints including rotational axes each causing a next joint to turn and rotational axes each causing a next joint to pivot, such that the rotational axes causing turning and the rotational axes causing pivoting are arranged alternately, the seven-axis articulated robot being configured such that at least one of rotational axes of three proximal end side joints of the robot does not intersect with other rotational axes of the three proximal end side joints at one point, the robot control device comprising:

a detector configured to detect a position of the robot;

a maximum and minimum value calculator configured to calculate a maximum value and a minimum value, which are possible values of a joint angle of a middle joint of the three proximal end side joints and which are values to be taken from an initial state at a start of operation of the robot, by performing inverse transformation while setting a joint angle of a distal end side joint among the three proximal end side joints to 0° (a reference position) or 180° (a maximum displacement position from the reference position);

a ratio calculator configured to calculate, as an index indicating an assumed elbow angle in a case where a rotational axis of the middle joint is assumed as a shoulder, a ratio of the joint angle of the middle joint in the initial state within a range from the maximum value to the minimum value; and an inverse transformation unit configured to perform inverse transformation using, as a constraint condition, such a joint angle of the middle joint as to cause the calculated ratio to be constant; and a controller configured to control the seven-axis articulated robot to move a tool member to a target position.

* * * * *